United States Patent [19]
Patterson

[11] Patent Number: 5,427,270
[45] Date of Patent: Jun. 27, 1995

[54] WATER RESISTANT CONTAINER FOR ELECTRICAL CONNECTORS

[76] Inventor: Don Patterson, 4298 Shirley La., Salt Lake City, Utah 84123

[21] Appl. No.: 145,983

[22] Filed: Oct. 29, 1993

[51] Int. Cl.⁶ .......................................... H02G 15/08
[52] U.S. Cl. ..................................... 220/250; 174/87; 174/74 R
[58] Field of Search ............... 220/254; 174/87, 74 R, 174/76, 84 R, 138 F

[56] References Cited

U.S. PATENT DOCUMENTS 5,113,037  5/1992  King, Jr. .
5,151,239  9/1992  King, Jr. .
5,252,779 10/1993  DiRienzo .

OTHER PUBLICATIONS

Brochure—King "One-Step", ©1992 King Technology, Inc.
Instruction Sheet—DBY-5 Direct Bury Splice Kit 600 Volts, 3M Electrical Products Division.

*Primary Examiner*—Joseph Man-fu Moy
*Attorney, Agent, or Firm*—Thorpe, North & Western

[57] ABSTRACT

A water resistant and fire retardant container for releasably encapsulating an electrical connection includes a housing having an opening and a receiving chamber for receiving a wire nut having an electrical connection therein between contacting ends of electrical wires. The receiving chamber is pre-filled with water resistant sealing gel. An end cap is removably interlocked with a circular lip of the housing at the opening and includes a plurality of flexible segments extending from a perimeter opening within the end cap radially inward. The flexible segments are positioned common to a single plane and converge toward a common point to form a flexible, segmented cover over the housing opening. A locking ring is disposed within the receiving chamber below the end cap for allowing one-way passage of the wire nut therethrough. The wire nut is pushed through the flexible cover and further through the locking ring into the receiving chamber in a seated position between a bottom of the housing and the locking ring such that the sealing gel sealably covers the electrical connection within the wire nut. The container thereby forms a water resistant, fire retardant electrical connection.

11 Claims, 4 Drawing Sheets

Fig. 11
Fig. 12
Fig. 13
Fig. 14
Fig. 15
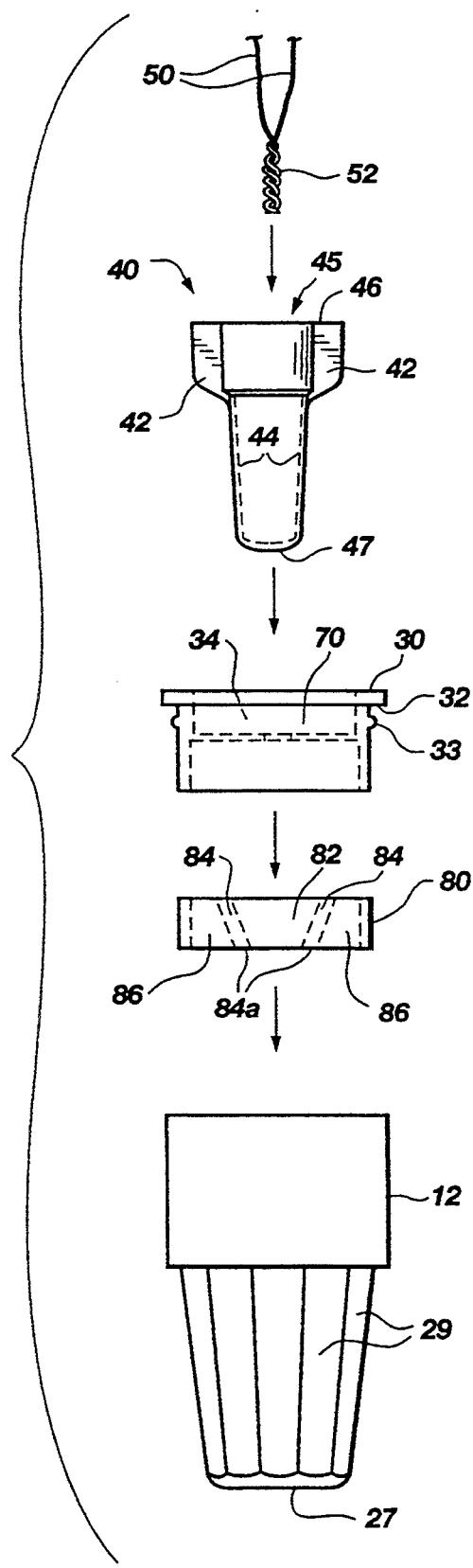
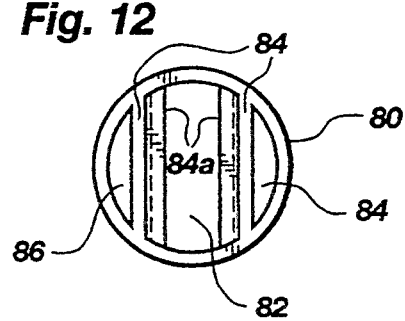
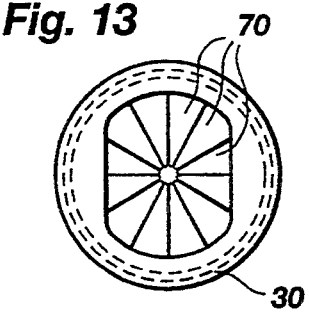
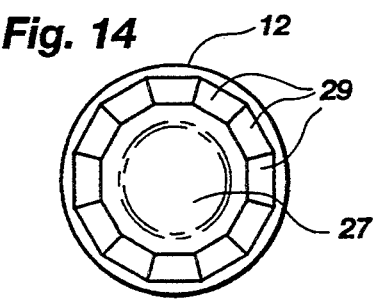
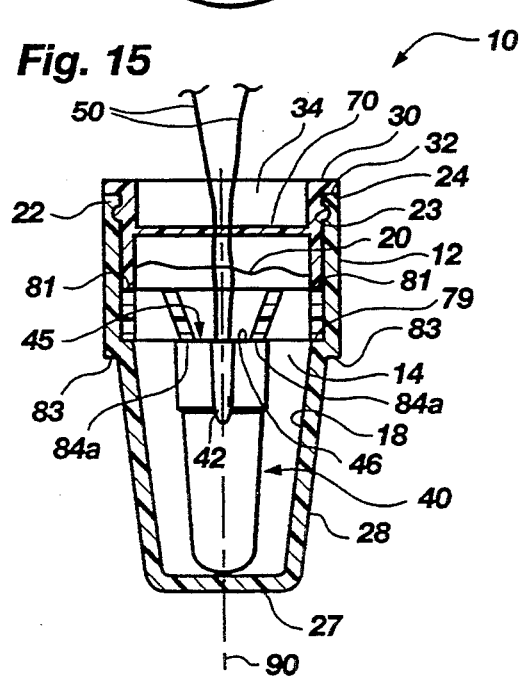

WATER RESISTANT CONTAINER FOR ELECTRICAL CONNECTORS

BACKGROUND OF THE INVENTION

1. The Field of the Invention

The present invention relates generally to water resistant and fire retardant containers. More particularly, it concerns a reusable container for releasably encapsulating an electrical connection formed within a wire nut between contacting ends of a plurality of electrical wires.

2. The Background Art

A number of devices and methods for establishing an electrical connection between a plurality of wires are known in the construction industry and other electricity-related industries. Wire nuts, for example, are used to establish and insulate such electrical connections. As used herein, the term "wire nut" refers generally to a small non-conductive cap having a wire receiving cavity, at least a portion of said cavity being defined by a low-resistance conductive surface for engaging contacting ends of a plurality of electrical wires. The conductive surface is typically threaded to more effectively engage the wire ends. A user entwines the ends of the wires and places the entwined ends into the wire receiving cavity. The user then holds the wires firmly in one hand and twists the wire nut with the other hand. The twisting action enables the threaded conductive surface to pull the entwined ends further into the receiving cavity and firmly engage said ends into a low resistance electrical contact.

Wire nuts are simple and easy to use and permit a user to quickly establish a firm, insulated electrical connection. Although an electrical connection can easily be made by simply twisting the ends of two wires together, the wire nut improves such a connection in a number of ways. The threaded conductive surface lodges the wires firmly together to prevent separation and to increase the contacting surface area between the wires. The non-conductive cap insulates users from any electrical current passing through the wires.

However, wire nuts do not offer sufficient protection against moisture and sparking. It is often the case that electrical connections are made in both wet and dry locations, and under gaseous and other conditions. When subject to moisture or humidity, an electrical connection can develop an oxidation layer and/or a short within the wires. Moreover, electrical connections can produce sparks capable of igniting volatile gases, dry goods and other flammable material. A known solution to these problems is to place a pliable sealant around the wire nut. Prior art sealants include both hardening and non-hardening compounds, both of which produce a waterproof capsule over the wire nut and the contacting ends of the wires.

It has been found to be time consuming, laborious and messy to use sealing compounds as described above. It is bothersome to keep separate sealing compounds around, and it is messy to apply them. In addition, an application of sealing compound on one electrical connection can be easily smeared off onto other wires or parts.

Containers of sealing compound have been developed to more effectively encase electrical connections within a sealing compound. U.S. Pat. No. 5,151,239 (issued to King, Jr., Sep. 29, 1992) teaches an enclosure having a conductive, threaded wire engaging inner surface disposed within a housing and filled with a sealing compound. A flexure cover closes off the enclosure. A user inserts entwined ends of electrical wires through the flexure cover into the housing and into the sealing compound until the entwined wires reach the wire engaging surface. The user then twists the housing about the wire ends such that the ends are drawn further into the enclosure and become firmly lodged therein. The King patent thus teaches a container having essentially a self-contained wire nut. The teachings of King fail to allow the use of a separate, independent wire nut. Further, it is more difficult to connect the wires with a container in the manner of King because such a container requires a user to push wires through a flexure cover, through sealing compound and into a threaded enclosure.

Containers have been developed for receiving a separate and independent wire nut therein. For example, a brochure by 3M (DBY-6 Direct Bury Splice Kit, Part No. 054007) teaches a container for receiving a wire nut and retaining flanges for retaining the wire nut within the container. A user twists wires into a wire nut in the traditional fashion, then places the wire nut with the wires extending therefrom into the container. The wire nut is pushed further into the end of the container and surpasses the retaining flanges, which retain the wire nut in a seated position and prevent the wire nut from being removed. An end cap having a living hinge snaps shut the container to completely encapsulate the wire nut, the end cap having slots to accommodate the wires extending out of the wire nut.

The 3M apparatus permits the use of a conventional-type wire nut and offers retaining flanges disposed on interior side walls of a container to retain the wire nut in a firm, seated position. However, the container taught in the 3M brochure offers limited capacity to retain various sizes of wire nuts. Further, the 3M brochure fails to teach removability of the wire nut, since the wire nut cannot be retrieved after it has been pushed beyond the retaining flanges unless the container is broken apart. This makes reusability of the container and future examination of the connection impractical. Moreover, it requires additional time and bother to position the wires within the end cap slots in order to close the end cap.

There is thus a need to achieve a reusable container for encapsulating a wire nut to thereby render water resistant and fire retardant an electrical connection which is simple in design and easy to use. Those having ordinary skill in the art will appreciate that these and other needs are met by the present invention. The disadvantages of the prior art noted above, and others not specifically mentioned, are overcome in the present invention by provision of a reusable container having a removably mounted end cap through which a wire nut is inserted.

OBJECTS AND SUMMARY OF THE INVENTION

It is therefore an object of the present invention to provide a water resistant container for releasably encapsulating an electrical connection formed within a wire nut between wires extending therefrom.

It is an additional object of the invention to provide such a container which is reusable.

It is another object of the invention to provide such a container which significantly minimizes the effort required to establish a water resistant electrical connection.

It is also an object of the invention to provide such a container effective in preventing spark emissions from the electrical connection.

It is a further object of the invention to provide such a container which can be opened without unduly smearing or spilling sealing gel disposed therein.

It is still another object of the invention to provide such a container which is simple in design and easy to use.

It is an additional object of the invention to provide a wire label apparatus for use in identifying wires used in conjunction with the container, as well as other wires.

While the present invention is described in terms of a water resistant container for electrical connections, it is to be understood that the principles of the invention may be used in any setting requiring the encapsulation of a small part from which wires or similar structures extend. Those having ordinary skill in the field of this invention will appreciate the advantages of the invention, and its application to a wide variety of uses.

The above objects and others not specifically recited are realized in an illustrative embodiment of a water resistant container for encapsulating a wire nut holding together electrical wires. The container includes an elongate housing having a receiving chamber for receiving the wire nut. Water resistant sealing gel is disposed within the receiving chamber for encapsulating at least a portion of the wire nut and the contacting ends therein to thereby inhibit moisture from contacting the electrical connection. A removably mounted end cap includes a flexure pocket formed from a plurality of flexible segments through which the wire nut containing the wires is pushed. When the wire nut penetrates the flexure pocket to reach the receiving chamber, the flexible segments co-act with positioning ribs disposed on an inner surface of the receiving chamber to retain the wire nut in a seated position.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 11 is an exploded, side view of another alternative embodiment of a water resistant container system made in accordance with the principles of the present invention;

FIG. 12 is a top view of a locking member of the container system of FIG. 11;

FIG. 13 is a top view of an end cap of the container system of FIG. 11;

FIG. 14 is an end view of the bottom of a housing of the container system of FIG. 11; and FIG. 15 is an assembled, cross-sectional view of the container system of FIG. 11.

Figure 1:
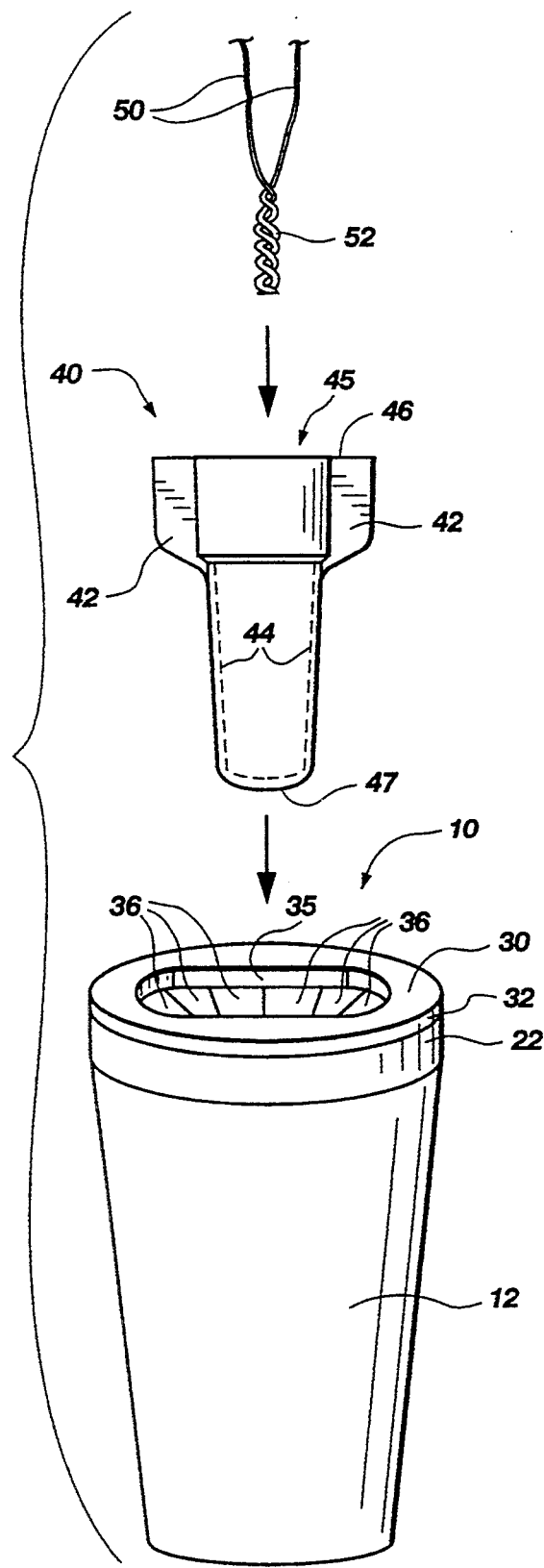
FIG. 1 is a perspective view of a water resistant container system made in accordance with the principles of the present invention, prior to insertion of a wire nut therein.

DETAILED DESCRIPTION OF THE PRESENTLY PREFERRED EMBODIMENTS OF THE PRESENT INVENTION

Reference will now be made to the drawings wherein like structures will be provided with like reference numerals.

Referring to FIG. 1, there is shown a water resistant and fire retardant container system generally designated at 10 for releasably encapsulating an electrical connection formed within a wire nut, generally designated at 40. The electrical connection is made between contacting ends 52 of a plurality of electrical wires 50 extending from said wire nut. The container system 10 includes an elongate housing 12 and an end cap 30. The wire nut 40 is about one inch long, and the container system 10 is about two or three inches long, although these dimensions may vary.

Figure 2:
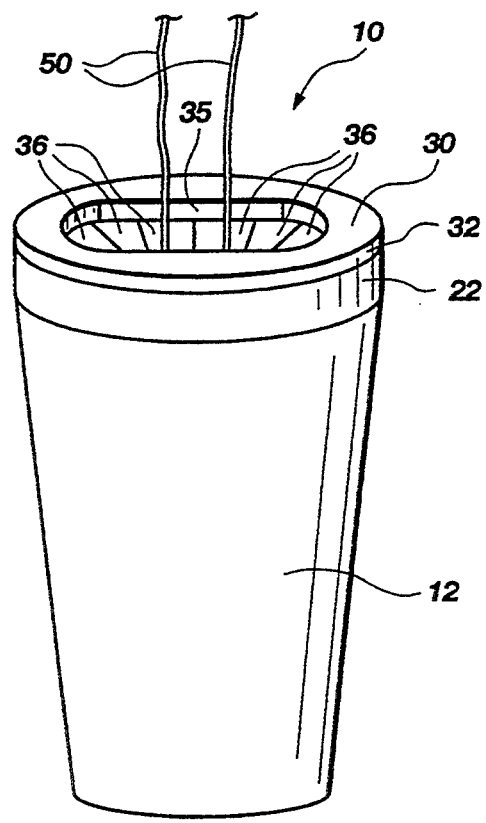
FIG. 2 is a perspective view of the container system of FIG. 1, in use.

It is intended that the wires 50 comprise insulated electrical wires as known in the art. It is further intended that a user remove the insulation from the wire ends and twist them together to form an entwined junction 52 of contacting wire ends. The wire junction 52 is inserted into the wire nut 40 in the direction shown and twistably lodged therein as known in the art. The wire nut is further inserted into the container system 10 in the direction shown to quickly and easily form a water resistant, fire retardant electrical connection, as illustrated in FIG. 2. This will be more fully explained below.

Figure 3:
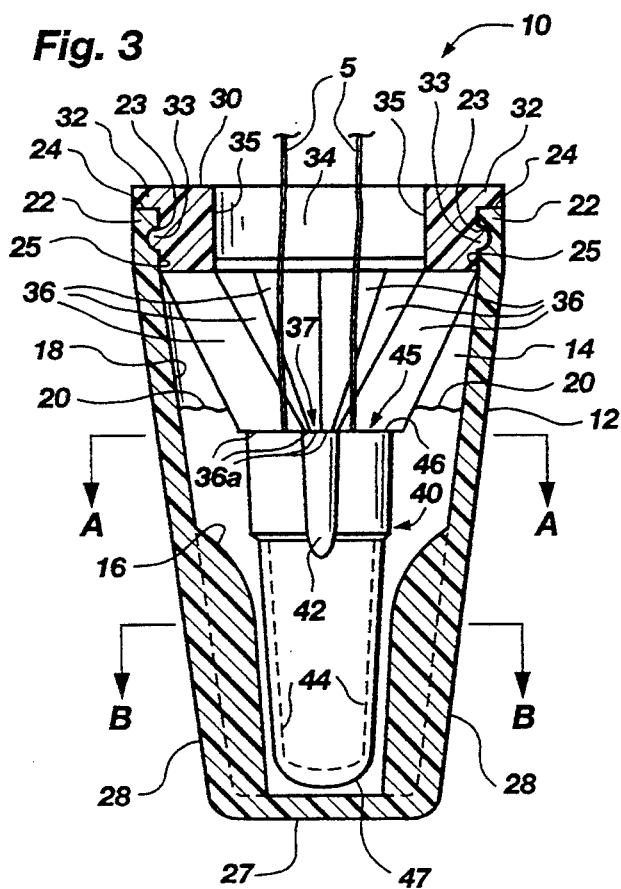
FIG. 3 is a side, cross-sectional view of the container system of FIGS. 1-2.

Referring to FIG. 3, there is shown a side, cross-sectional view of the container system 10 of FIGS. 1-2. The housing 12 includes a cylindrical open end 25 bounded by an upper circular lip 22. The housing 12 defines a receiving chamber 14 therein for receiving the wire nut 40. Positioning ribs 16 are disposed on an inner surface 18 of the receiving chamber 14 for holding the wire nut 40 in a seated position. The receiving chamber 14 is at least partially filled with a sealing gel 20 for encapsulating the wire nut 40 and the contacting ends of the electrical wires 50 within said wire nut. The housing also includes an outer surface 28 and a closed end or bottom 27. The outer surface 28 is preferably radially tapered as shown to enhance gripping action during handling and operation of the container system 10, but may comprise any shape or configuration.

Rotatably connected to the circular lip 22 is the end cap 30. The end cap 30 releasably interlocks with said circular lip 22 by provision of a tongue and groove configuration 33 and 23, an annular tongue 33 extending radially outward from side walls of the end cap 30 and an annular groove 23 formed in the inner surface 18 at the lip 22. The annular tongue 33 engages the annular groove 23 to retain the end cap 30 firmly against the lip 22. The tongue and groove configuration 33 and 23 thereby inhibits, but does not completely prevent, removal of the end cap 30 from the housing 12, and permits rotational movement of the end cap 30 with respect to the housing 12. While the tongue 33 is shown as annular, it need only be sufficiently long so as to hold the end cap 30 in a firm grip, and thus may alternatively comprise a plurality of lip segments, or even a single, partially annular lip segment.

The end cap 30 includes an annular rim 32 which rests on a top surface 24 of the circular lip 22. The end cap 30 further includes a cap opening 34 bounded by a perimeter face 35. A radial array of flexible segments 36 integral with the cap 30 are angled inwardly to extend from the perimeter face 35 into the receiving chamber 14 at an acute angle with respect to the cap opening 34 to thereby converge toward a common point. Each flexible segment 36 thus extends from the perimeter face 35, terminates at a segment end 36a, and forms a side wall of a flexible segmented pocket which substantially closes off the open end 25 of the housing 12. The segments ends 36a collectively form a porthole 37, but may alternatively be configured to completely close off the open end 25. Claim language directed to flexible segments which converge toward a common point therefore covers both of these configurations.

Prior to use, a plurality of container systems 10 are typically stored in a box. The flexible segments 36 effectively prevent the sealing gel 20 from leaking during storage and handling. It is to be understood that the container system 10 can be modified to accommodate the use of a waterproof sealing gel that sets only upon substantial exposure to air. For example, the flexible segments 36 could be sealed together at their edges 36b (see FIG. 4) with a thin, puncturable material such as plastic, fiberglass or some polymeric compound, and the same material could close off the porthole 37 such that the entire open end 25 of the housing 12 is completely closed off.

Referring to FIGS. 1 and 3, the wire nut 40 is virtually identical to existing wire nuts or twist on wire connectors, and preferably includes wings 42 extending radially outward therefrom. The wire nut 40 preferably includes a low resistance, electrically conductive, threaded wire-engaging surface 44 defining a wire receiving cavity 45 as known generally in the art. Said wire nut includes an open end 46 and a closed end 47. Electrical wires 50 are twisted into the wire receiving cavity 45 and are held in place by the wire-engaging surface 44 to thereby provide a low resistance electrical connection therebetween. It will be appreciated that the wire-engaging surface 44 need not be electrically conductive in order to establish an electrical connection between the electrical wires 50. Further, while only two wires 50 are shown, a user can use the invention with a single wire or with more than two wires.

The sealing gel 20 shown in FIG. 3 preferably comprises a dielectric silicone or some other viscous sealant having sufficient fluidity to flow around and between solid parts, and sufficient viscosity to maintain sealant properties. It is preferable that the sealing gel be both water resistant and fire retardant. It is to be understood that other materials can be used, for example compounds that set after substantial exposure to the air.

As previously mentioned, the electrical wires 50 form an electrical connection (not shown) within the wire nut 40 in the manner generally known in the art, i.e. by being twisted into and lodged within the wire receiving cavity 45 by wire engaging surface 44. The electrical wires will typically comprise standard insulated wires, the ends of which are sufficiently exposed to permit entwinement. The sealing gel 20 encapsulates the wire nut 40 and the exposed, entwined ends of the electrical wires 50. By encapsulating the exposed portions of the wires 50, the sealing gel 20 prevents oxidation of said exposed ends and inhibits the wires 50 from working loose from the wire nut 40. The encapsulating action of the sealing gel 20 also inhibits sparks from being projected from the exposed ends of the wires 50 which could ignite volatile gases and other flammable material.

Figure 4:
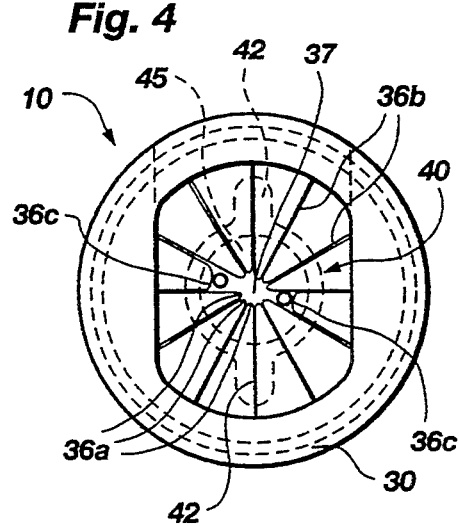
FIG. 4 is a top view of the container system of FIGS. 1 and 2, including a phantom top view of a wire nut enclosed therein.

FIG. 4 shows a top view of the container system 10 of FIGS. 2–3, with a top view of the wire nut 40 shown in phantom below the flexible segments 36. FIG. 4 illustrates how the segment ends 36a flex inward at 36c to permit the wire nut 40 to be inserted into the receiving chamber 14, and to permit the electrical wires 50 to extend from said wire nut out through the end cap 30. The flexible segments 36 thus deflect to permit a wire nut 40 to be inserted therethrough and return to substantially their original shape to close off the receiving chamber 14 and seal around the wires 50.

In order to understand the operation of a preferred embodiment in accordance with the invention, reference should be made to FIGS. 1–3, with the understanding that the wire nut 40 is structurally separate from the container system 10. A user can form a water resistant, fire retardant, spark inhibiting, low resistance electrical connection between the electrical wires 50 with the container system 10 in the following ways, and in other ways equivalent thereto.

In a preferred embodiment, a user takes from a package the container system 10 and the wire nut 40, which has not yet been inserted into the container system 10. Although the end cap 30 is removable, it comes already snapped onto the circular lip 22 in order to prevent the sealing gel 20 from leaking. The user exposes the ends of a plurality of insulated wires 50 and twists them together to form an entwined junction 52 of contacting wire ends as known in the art (see FIG. 1). The entwined wire junction 52 is inserted into the wire nut 40 to reside within wire receiving cavity 45. The user then grasps the wire nut 40 and the wires 50 and twists them relative to each other such that wire engaging surface 44 firmly grips the entwined wire junction 52 and holds it in a secured position to thereby form a low resistance electrical connection.

The wire nut 40 is inserted into the end cap opening 34 (see FIG. 3) to rest against the flexible segmented pocket formed by the flexible segments 36. The wire nut 40 is pushed further into the container system 10 so that the flexible segments 36 deflect responsive to said wire nut to thereby allow said wire nut to enter the receiving chamber 14 and abut the bottom 27 of the housing 12.

The flexible segments have sufficient elastic memory such that they return to substantially their original shape after the wire nut 40 has passed through them to thereby re-close the open end 25 and seal around the wires 50 which extend from the wire nut 40. The elastic memory of the flexible segments 36 may be evidenced by a "click" sound immediately after the wire nut 40 has passed through said segments, if said segments comprise a relatively stiff but flexible material. The segment ends 36a abut against the open end 46 of the wire nut 40 to co-act with the positioning ribs 16 to retain said wire nut in a seated position against said positioning ribs.

As the wire nut 40 is pushed beyond the flexible segments 36 and into the receiving chamber 14, the sealing gel 20 flows around the wire nut 40 to engulf said wire nut and flow into the wire receiving cavity 45 to thereby encapsulate the entwined, contacting ends of the electrical wires 50 forming the wire junction 52. The sealing gel 20 thereby forms a protective covering over the actual connection. As previously mentioned, it is already known to twist electrical wire ends into a wire nut to form an electrical connection. The present invention thus requires the single step of pushing the wire nut into the container system 10 to transform the common, largely unprotected prior art electrical connection into a water resistant, fire retardant, spark inhibiting, low resistance electrical connection.

An alternative embodiment includes the additional arrangement of the wire nut 40 being pre-inserted into the receiving chamber 14 of the housing 12 and engulfed in the sealing gel 20, said sealing gel also filling the wire receiving cavity 45. This embodiment is used by simply grasping the housing 12, inserting the entwined ends of contacting wires forming the wire junction 52 through the flexible segments 36, and twisting said wire ends into the wire nut 40 to thereby firmly lodge said wire ends within the wire receiving cavity 45 and against the wire engaging surface 44. In short, this alternative embodiment simply entails that the wire nut 40 is pre-inserted into the receiving chamber 14 of the housing 12 before the electrical wires 50 are twisted into the wire nut 40. The wings 42 of the wire nut 40 can be designed to abut the ribs 16 to thereby prevent said wire nut 40 from turning within the housing 12 while a user is twisting the wires junction 52 into said wire nut 40.

The flexible segments 36 thus provide a self forming opening that automatically conforms to the size and shape of the electrical wires 50. There is thus no need to open or close the end cap 30 in order to insert the wire nut 40, or to manually position the wires 50 relative to the end cap 30 after the wire nut 40 has be inserted. Further, the rotatability of the end cap 30 relative to the housing 12 as enabled by the tongue and groove configuration 23 and 33 allows the user to rotate said end cap 30 in order to, for example, enhance the flowing of the sealing gel into the wire receiving cavity 45 as desired. The rotatability of the end cap 30 is also useful for further lodging the wires 50 within the housing 12, and has additional utility understandable to those skilled in the art.

Referring still to FIGS. 1–3, an advantage of the end cap 30, the housing 12, and the tongue and groove configuration 23 and 33 by which said end cap and housing releasably interlock is that one can quickly convert a conventional wire nut into the present invention by merely pushing said wire nut through the flexible pocket formed by the flexible segments 36. The removability of the end cap 30 permits the wire nut 40 to be removed from the container without difficulty and thus allows for reusability of the container system 10. Further, the very slight penetration of the end cap 30 into the housing 12 as shown in the accompanying drawings permits the container system 10 to be opened without unduly smearing or spilling the sealing gel 20. The end cap 30 may alternatively be permanently fixed upon the housing 12, and the wire nut 40 and inner surface 18 of housing 12 may be cooperatively adapted to enable said wire nut to be screwably inserted therein.

A significant aspect according to the present invention includes a precise tolerance between the positioning ribs 16 and the segments ends 36a of flexible segments 36. This tolerance advantageously corresponds to the exterior dimensions of the wire nut 4C such that one can insert the wire nut 40 through the flexible segments 36 without opening anything and thereby cause said wire nut 40 to be snugly retained in a seated position against said positioning ribs 16. The end cap 30 thus enables quick and simple entry of the wire nut 40 into the container system 1C) and cooperates with the positioning ribs 16 to provide a snug and secure fit of the wire nut 40 within the container system 10. It is to be understood that many different tolerances can be achieved for many different sizes of wing nuts.

The flexible segments 36 can be made from a poller plastic or the like. The housing 1.2 and the end cap 30 can be made from any material that is water resistant and/or fire retardant and which has sufficient rigidity to accomplish the purposes of the present invention.

Although the container system 10 will typically be pre-filled with the sealing gel 20, it is also consistent with the principles of the present invention to use on site selection and injection of sealing gel into the receiving chamber 14. For example, one could use a gel dispenser to inject sealing gel into the container system 10 prior to insertion of the wire nut 40 and/or the electrical wires 50 therein, depending on the particular embodiment used. Further, a plurality of sealing gels can be used with the present invention. If only water proofing is desired a water resistant sealing gel which is not fire retardant can be used. It similar fashion, if only fire resistance is desired, a fiber retardant sealing gel which is not known for being water resistant can be used. Alternatively, separate sealing gels may be used simultaneously with the invention. The present invention thus permits field selection of the sealing gel to enable the user to tailer the use of the invention to the particular needs of the installation.

Figure 5:
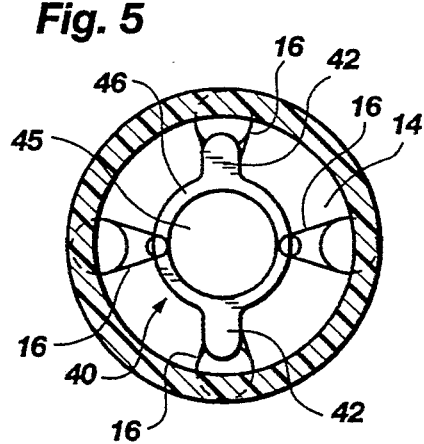
FIG. 5 is a cross-sectional view of the container system of FIG. 3, taken along section A—A.
Figure 6:
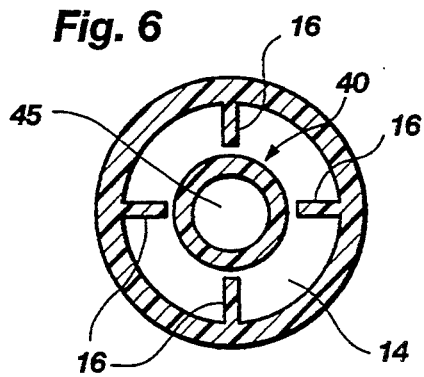
FIG. 6 is a cross-sectional view of the container system of FIG. 3, taken along section B—B.

FIGS. 5–6 show cross-sectional views taken along sections A—A and B—B of FIG. 3, respectively, and provide additional viewpoints of the designated structures within the container system 10. FIG. 5 shows the exterior dimensions of the open end 46 and wings 42 of the wire nut 4C in relation to the receiving chamber 14. The wings provide the advantage of additional surface area for contact with the segment ends 36a of the flexible segments 36 to thereby permit a more secure fit of the wire nut 40 within the container system 10. The wings 42 extend radially outward from the wire nut 40, and are preferably thin relative to said wire nut 40 so that placement of said wire nut 40 into the container system 10 will be quick and easy, despite the additional contacting surface area provided by said wings. As previously discussed, said wings 42 may be designed to contact sides of the positioning ribs 16 to prevent free rotation of the wire nut 40. FIG. 6 shows the precise tolerance between a lower exterior portion of the wire nut 40 and the positioning ribs 16.

Figure 8:
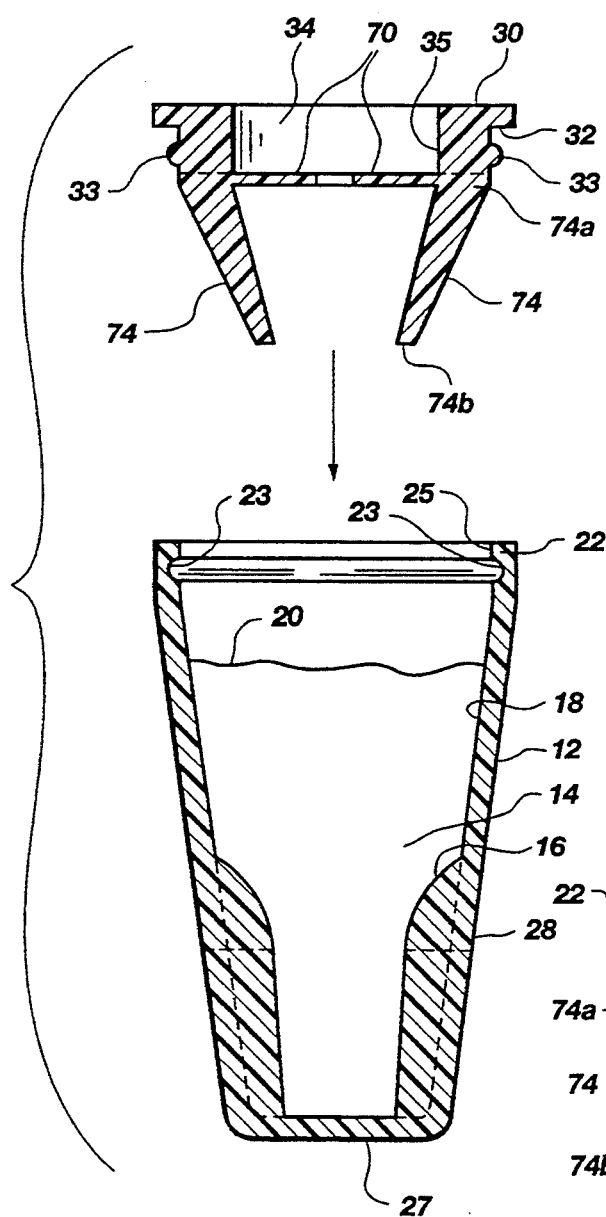
FIG. 8 is an exploded, side cross-sectional view of an alternative embodiment of a water resistant container system made in accordance with the principles of the present invention.
Figure 9:
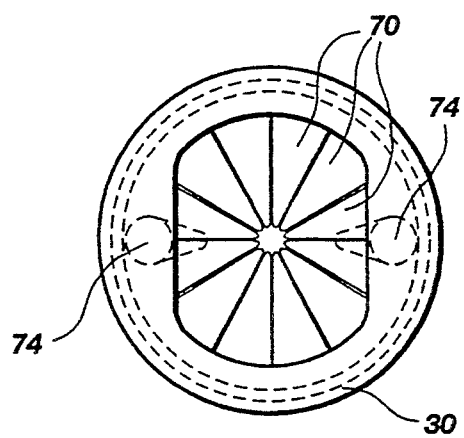
FIG. 9 is a top view of an end cap of the container system of FIG. 8, with portions thereof shown in phantom.
Figure 10:
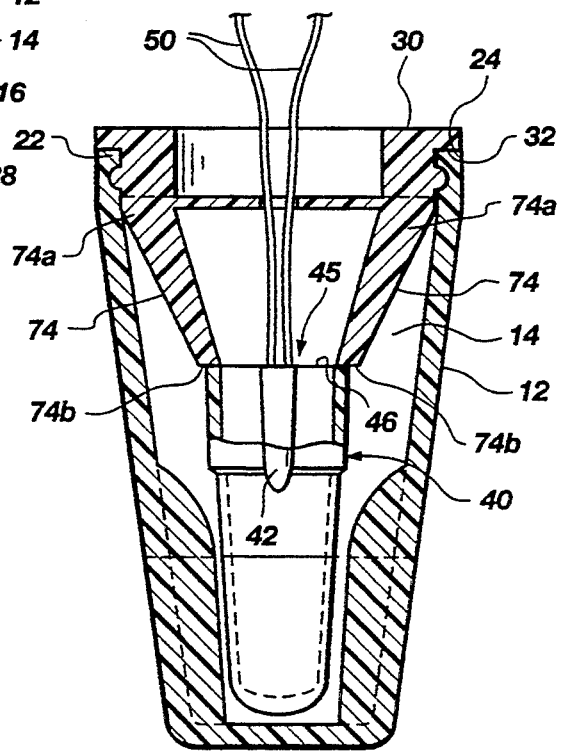
FIG. 10 is an assembled, side cross-sectional view of the container system of FIG. 8, showing a wire nut inserted therein.

Another alternative embodiment of the present invention is illustrated in FIGS. 8–10. In this embodiment, the end cap 30 includes a radial array of flexible segments 70. As opposed to the segments 36 of FIGS. 1–4, the flexible segments 70 are positioned generally perpendicular to the axis of the cap opening 34 to form a flexible, segmented covering, instead of a pocket. Said covering substantially closes off the cap opening 34. The end cap 30 further includes a pair of support arms 74 attached at proximal ends 74a to the bottom of the end cap below the flexible segments 70. The support arms 74 extend into the receiving chamber 14 and terminate at distal ends 74b. The end cap 30 of FIGS. 8–10 releasably interlocks with said circular lip 22 by provision of the same tongue and groove configuration 33 and 23 as shown in FIGS. 1–3.

When the end cap 30 is releasably interlocked with the lip 22 as in FIG. 10, the distal ends 74b of the support arms 74 are separated from the bottom 27 of the housing 12 by a distance greater than the length of the wire nut 40. Said support arms 74 are also separated from each other by a distance less than the width of the wire nut end 46. The support arms 74 are sufficiently flexible to deflect responsive to the wire nut 40 being pushed between said support arms 74 into a lower portion of the receiving chamber 14.

The support arms 74 have elastic memory such that they return to substantially their original shape after the wire nut 40 has been pushed beyond them, as in FIG. 10. Since the wire nut 40 is larger at its end 46 than the distance between the distal ends 74b of the arms 74, the wire nut is thereby held in place, and cannot be practicably removed unless the endcap 30 is pried out of the housing 12. It will thus be appreciated that the rounded tip 47 of the wire nut 40 permits said wire nut to be pushed, tip first, between the arms 74 into the chamber 14, but that the wider end 46 prevents the wire nut 40 from being removed therefrom. The flexible segments 70 also have elastic memory sufficient to return to substantially their original shape after the wire nut 40 is pushed, tip first, through the segmented covering formed from said segments. The segments 70 retain the sealing gel 20 within the receiving chamber 14 and laterally secure the electrical wires 50 extending from the wire nut 40.

Still another alternative embodiment is presented by FIGS. 11–15. This embodiment differs in some respects from that shown in FIGS. 8–10. For example, the end cap 30 includes the flexible segments 70 but not the support arms 74. Further, the container system 10 includes a separate locking ring 80 which is preferably removably disposed within the receiving chamber 14. The locking ring 80 contacts, and is held in place by, an interior ridge 79 formed on the inner surface 18 of the housing 12. The locking ring 80 may alternatively be held in place by inward tapering of the inner surface 18 if desired, instead of by the ridge 79. An outer ridge 83 is formed on the outer surface 28 to enhance gripping of the housing 12.

The locking ring 80 includes a passage 82 and two opposing locking walls 84 which respectively separate the passage 82 from two voids 86. As indicated by FIGS. 11–12, the walls 84 substantially span a central portion of the ring 80, near the middle of said ring. The walls 84 are preferably elongate, and are thus interposed in their longitudinal direction between opposing portions of an inner surface of the ring 80, as shown most clearly in FIG. 12. Therefore, when the ring 80 is positioned within the receiving chamber 14, the walls 84 extend laterally across said receiving chamber 14 in their longitudinal direction, and thereby substantially span said receiving chamber between opposing portions of the inner surface 18 of the housing 12. The walls 84 include preferably parallel distal edges 84a for retaining the wire nut 40 within the receiving chamber 14. The ring 80 thus holds the walls 84 in an opposing position relative to each other. The walls 84 are preferably angled inward relative to a long axis 90 of the housing 12, and parallel in a direction perpendicular to said long axis 90. The ring 80 is preferably removably disposed against the ridge 79, but may instead be fixedly attached to the housing 12 within the receiving chamber 14.

The embodiment of FIGS. 11–15 is such that the locking ring 80 rests against the ridge 79. The end cap 30 interlocks with the lip 22 and contacts the ring 80 at an end-to-end contacting point 81 to thereby secure said locking ring firmly in place against the ridge 79 in an upper portion of the receiving chamber 14. The housing 12, locking ring 80 and endcap 30 are preferably positioned in substantial co-axial orientation with each other.

When the ring 80 is secured within the receiving chamber 14, the distal edges 84a of the locking walls 84 are separated from the bottom 27 of the housing 12 by a distance greater than the length of the wire nut 40. Said locking walls 84 are also separated from each other by a distance less than the width of the wire nut end 46. The walls 84 are sufficiently flexible to deflect responsive to the wire nut 40 being pushed between them through the passage 82 into a lower portion of the receiving chamber 14.

The locking walls 84 have elastic memory such that they return to substantially their original shape after the wire nut 40 has been pushed beyond them, as in FIG. 15. Since the wire nut 40 is larger at its end 46 than the distance between the distal edges 84a of the walls 84, the wire nut is thereby held captive between said distal edges 84a of the walls 84 and the bottom 27 of the housing 12. The locking ring 80 thus allows one-way passage of the wire nut 40 therethrough into said receiving chamber 14, and the wire nut 40 practicably cannot be removed unless the endcap 30 is pried out of the housing 12 with a pocketknife, for example.

It will thus be appreciated that the rounded tip 47 of the wire nut 40 permits said wire nut to be pushed, tip first, between the walls 84 into the chamber 14, but that the wider end 46 prevents the wire nut 40 from being removed therefrom. The flexible segments 70 also have elastic memory sufficient to return to substantially their original shape after the wire nut 40 is pushed, tip first, through the segmented covering formed from said segments. The segments 70 retain the sealing gel 20 within the receiving chamber 14 and laterally secure the electrical wires 50 extending from the wire nut 40.

It will also be appreciated that an embodiment in accordance with the invention as in FIGS. 11–15 can be made to accommodate a range of wire nut sizes. It is known in the field to use larger wire nuts for larger wires, but many prior art wire nut containers will only accommodate a single wire nut size.

Those skilled in the relevant art will appreciate additional advantages of the embodiment shown in FIGS. 11–15. For example, the distal edges 84a of the locking walls 84 provide extra support to retain the wire nut 40 by substantially spanning the receiving chamber 14 between the inner housing surface 18. The locking ring 80 is easier to mold than other retaining structure taught in the prior art. The flexible segments 70 help retain the sealing gel 20 within the receiving chamber 14. Both the end cap 30 and the locking ring 80 are completely removable from the housing 12 to enable removability of the wire nut 40, reusability of the container system 10, intermittent inspection of the electrical connection, and so forth. A user may desire to inject additional gel 20 into the receiving chamber when reusing the container system 10, although this is optional. The locking ring 80 is separate from the end cap 30 to simplify the molding process.

A further advantage of the present invention is that a wire nut can be waterproofably encapsulated by the container system 10 as shown in FIGS. 11-15 in a single step—by simply inserting the wire nut 40 through the flexible segments 70, past the locking walls 84, and into a lower portion of the receiving chamber 14. The container system 10 is thus very simple to use; there is no hinged lid or cover which must be opened or removed in order to insert the wire nut 40 into the container. The segments 70 and the walls 84 are preferably made from a plastic, and the elastic memory thereof is evidenced by a "click" sound immediately after the wire nut 40 is pushed beyond each of those two structures.

A lower exterior portion of the housing 12 includes side-segments 29. There are preferably twelve such side segments 29 which are useful for numbering or otherwise distinguishing the specific wires 52 from other wires. For example, removable marking structure can be placed on each panel; a user could then remove marking structure from one or more of the panels according to a code or numbering system to thereby distinguish among various wires used.

Figure 7:
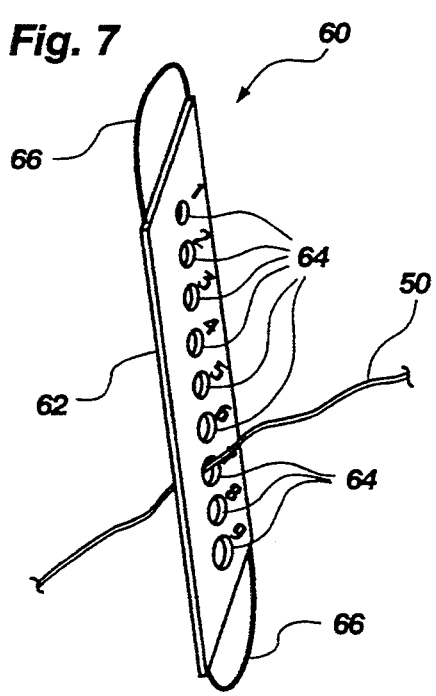
FIG. 7 is a perspective view of a wire label apparatus for use in identifying wires used in conjunction with the container of FIGS. 1 and 2.

Additional useful structure is illustrated in FIG. 7, which shows a wire label, generally designated at 60. The wire label 60 preferably comprises an elongate, substantially planar label body 62 having a plurality of labeled openings 64 for receiving a wire. Said label body 62 may comprise a plate made of fiberglass, plastic or some other polymeric compound, or from any other suitable material. Handles 66 made of wire or other suitable material are disposed on opposing ends of the wire label 60 for gripping.

Those having ordinary skill in the relevant art will appreciate many uses for the wire label 60. For example, if a plurality of wires are used for any purpose, it is often difficult to distinguish between the wires or to identify a particular wire from among the many wires in use. The wire label solves this problem. Referring to FIGS. 1-2 and 7, a user may, for example, use the container system 10 to make a connection between wires 50. Before twisting the wires 50 together as discussed above, the user can insert one of said wires through the label opening 64 labelled "7". Labeling each important wire with a wire label 60 permits the user to quickly identify and distinguish between the wires at a future time. It may thus be desirable to use a separate wire label 60 for each wire used in order to avoid unduly encumbering the wires, or if it is desirable to label the wires at locations remote from each other.

It is to be understood that the label openings 64 may alternatively be covered with a thin layer of puncturable plastic (not shown). This may further enhance the labeling utility of the wire label 60. For example, if only four wires are in use, a user may wish to label each wire with a separate wire label 60 using holes 1-4, and puncture the unused holes 1-4 in each wire label 60 such that at a future time, the user will know that only four wires are in use by looking at any of the wire labels. Those having ordinary skill in the art will appreciate that a plethora of additional uses exist for the wire label 60, both in conjunction with and separate from the container system 10.

The label body 62 may alternatively be non-planar and may comprise one or more openings 64. Handles 66 and label marks 1-9 are optional. The wire label 60 may be used to label other lines besides wires, such as ropes, carrier lines, mechanical chains or any line requiring labeling. The wire label 60 may also be used to label non-linear structures such as pegs, knobs or any structure for which said label 60 can be useful. The principles of the present invention include a label body 62 of any shape or thickness, and may from any material suitable for labeling the particular wires or lines to be used.

The present invention represents a significant advance over traditional apparatus and methods of rendering electrical connections water proof and/or fire retardant. It is noted that many of the advantages of the present invention accrue due to the releasable, rotatable end cap which includes angled flexible segments which co-act with the position ribs in a precise tolerance to both securely retain the wire nut and allow a quick and simple entry of said wire nut into the container. The problems associated with the laborious opening of hinged lids, retaining flanges and other structures which prevent removal of the wire nut, non-rotatability of the end cap, and so forth are overcome by the present invention. Although the prior art apparatus and methods for creating a water resistant and fire retardant electrical connection provide some capacity for effective containment of sealing gel and secure retainment of the wire nut, the present invention offers maximum convenience, flexibility and reusability while providing solutions to all of the other problems discussed herein. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A water resistant container system for releasably encapsulating and rendering water resistant an electrical connection formed within a wire nut between contacting ends of a plurality of electrical wires extending from said wire nut, said container system comprising:

housing means having a receiving chamber for receiving the wire nut, a closed end, and an opposing upper lip defining an opening to the receiving chamber;

a locking ring having an interior surface configured for removable insertion into the receiving chamber of the housing means for (i) allowing one-way passage of the wire nut through said locking ring into said receiving chamber and (ii) retaining said wire nut between said locking ring and the closed end of the housing means, said locking ring comprising first and second adjacent, spaced-apart locking walls having first and second elongate, spaced-apart distal edges, respectively, for retaining the wire nut within the receiving chamber, said locking walls being configured and dimensioned to extend laterally across the locking ring such that each of the first and second distal edges extends from one portion of the interior surface of the locking ring laterally across the locking ring to join at an opposing portion of said interior surface, said distal edges defining an elongate entry passage extending between said distal edges from a first portion of the interior surface of the locking ring to an opposing second portion thereof for allowing one-way passage of the wire nut through said passage; and covering means separate from the locking ring and being configured for placing over the opening to the receiving chamber and removably interlocking with the lip to thereby cover said opening such that the locking ring resides between the covering means and the closed end of the housing means, said covering means including an entrance formed therein for permitting one-way passage of the wire nut therethrough.

2. A container system as in claim 1 wherein the housing means further comprises an interior ridge disposed upon the interior side walls thereof for receiving the locking means in a seated position.

3. A container system as in claim 1 wherein the locking ring has an interior surface with each of the first and second locking walls being attached at opposing ends thereof to opposing portions of the interior surface of said tubular ring, said walls being angled toward each other at their distal edges to thereby define the elongate entry passage as an elongate wedge-shaped passage, said distal edges being substantially common to a single plane.

4. A container system as in claim 1 further comprising water resistant sealing gel disposed within the receiving chamber, said gel having sufficient viscosity to maintain sealant properties and sufficient fluidity to flow around and encapsulate at least a portion of the wire nut and the contacting ends of the wires therein when said wire nut is inserted into said receiving chamber to thereby inhibit moisture from contacting the electrical connection.

5. A container system as in claim 3 wherein the covering means comprises an end cap including:
 (i) a cap opening bounded by a perimeter face; and
 (ii) a radial array of flexible segments disposed on the perimeter face and extending radially inward into the cap opening such that said segments converge toward a common point and are substantially common to a single plane, said flexible segments collectively forming sides of a flexible segmented covering through which the wire nut can be pushed into the locking ring and receiving chamber.

6. A container system as in claim 5 wherein said flexible segments have elastic memory such that when the wire nut is being pushed through the flexible covering said flexible segments deflect responsive to said wire nut and return to substantially their original shape after said wire nut has passed through said covering into the receiving chamber to thereby provide a closure over said receiving chamber to retain the sealing gel within said receiving chamber.

7. A container system as in claim 4 wherein the sealing gel is fire retardant.

8. A container system as in claim 1 wherein the housing means further comprises a radially tapered outer surface.

9. A container system as in claim 1 further for labeling one or more of the electrical wires, said system further comprising a wire label including a label body having at least one labeling hole therein for receiving one of the electrical wires therethrough.

10. A container system as in claim 9 wherein the label body comprises an elongate, substantially planar plate having a plurality of labeling holes therein, each labeling hole being designated with a corresponding label marking.

11. A water resistant container system for releasably encapsulating and rendering water resistant an electrical connection formed within a wire nut between contacting ends of a plurality of electrical wires extending from said wire nut, said container system comprising:

a housing having a receiving chamber for receiving the wire nut, a bottom, and an opposing upper lip defining an opening to the receiving chamber;

a tubular locking ring having an interior surface and being configured for removable insertion into the receiving chamber, said locking ring including first and second adjacent, spaced-apart locking walls attached at opposing ends thereof to opposing portions of the interior surface of said locking ring so as to extend laterally across the receiving chamber of the housing, said locking walls having respective first and second distal edges substantially common to a single plane and being configured to extend from one portion of the interior side walls of the housing laterally across the receiving chamber to an opposing portion of said interior side walls, said locking walls being angled toward each other at their distal edges to thereby define an elongate wedge-shaped entry passage extending between said distal edges from a first portion of the interior surface of the locking ring to an opposing second portion of said interior surface for allowing one-way passage of the wire nut therethrough, said locking walls having sufficient flexibility to respectively deflect responsive to the wire nut being pushed between them through the entry passage into a lower portion of the receiving chamber, said locking walls also having elastic memory such that they return to substantially their original shape after said wire nut has passed beyond their distal edges such that said distal edges are engageable with the wire nut to thereby inhibit removal of said wire nut from the receiving chamber; and an end cap separate from the locking ring and being configured for placing over the opening to the receiving chamber and removably interlocking with the lip to thereby cover said opening and retain the locking ring between the end cap and the bottom of the housing, said end cap including:
 (i) a cap opening bounded by a perimeter face; and
 (ii) a radial array of flexible segments disposed on the perimeter face and extending radially inward into the cap opening such that said segments converge toward a common point and are common to a single plane, said flexible segments collectively forming sides of a flexible segmented covering configured to permit one-way passage of the wire nut therethrough into the locking ring and receiving chamber.

* * * * *